(12) United States Patent
Rohr, Jr.

(10) Patent No.: US 9,302,329 B2
(45) Date of Patent: Apr. 5, 2016

(54) BI-DIRECTIONAL QUICK CHANGE TOOL-LESS LEVER AND WEDGE ACTUATED COLLET CHUCK, SYSTEM AND/OR METHOD FOR USING THE SAME

(71) Applicant: Edward John Rohr, Jr., Chicago, IL (US)

(72) Inventor: Edward John Rohr, Jr., Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 14/109,768

(22) Filed: Dec. 17, 2013

(65) Prior Publication Data

US 2014/0103611 A1    Apr. 17, 2014

Related U.S. Application Data

(62) Division of application No. 12/800,938, filed on May 26, 2010, now Pat. No. 8,608,414.

(60) Provisional application No. 61/217,533, filed on Jun. 1, 2009.

(51) Int. Cl.
*B23B 35/00*    (2006.01)
*B23B 31/20*    (2006.01)

(52) U.S. Cl.
CPC ......... *B23B 31/201* (2013.01); *B23B 2260/096* (2013.01); *B23B 2260/146* (2013.01);
(Continued)

(58) Field of Classification Search
CPC ............... Y10T 279/17231; Y10T 279/17256; Y10T 279/17307; Y10T 279/17411; Y10T 279/17521; Y10T 279/18; Y10T 279/182; Y10T 279/24; Y10T 279/247; B23B 31/201; B23B 31/103; B23B 31/20; B23B 31/14

USPC ........ 279/129, 131, 35, 37, 43, 46.1, 50, 106, 279/107; 408/240
See application file for complete search history.

(56) References Cited

U.S. PATENT DOCUMENTS 198,280 A    12/1877  Dezendorf
421,718 A    2/1890   Ives
(Continued)

FOREIGN PATENT DOCUMENTS

DE    956 008    1/1957
DE    37 06 534  4/1988
(Continued)

OTHER PUBLICATIONS

International Search Report for corresponding PCT Application (e.g. PCT/US2010/001533) mailed Jul. 28, 2010 (2 pages).
(Continued)

*Primary Examiner* — Daniel Howell
*Assistant Examiner* — Nicole N Ramos
(74) *Attorney, Agent, or Firm* — Maginot Moore & Beck LLP (57) ABSTRACT

A bi-directional quick change tool-less lever and wedge actuated collet chuck, a system and/or a method provide symmetrical tool bit shank holding pressure before, during and after operation of a rotary-style power tool. The collet chuck is attached to and/or is integrated with high speed, variable speed and/or low speed rotary-style power tools, such as, for example, electrically driven rotary-style power tools and/or pneumatically-driven rotary-style power tools. The collet chuck provides tool-less automatic and/or tool-less manual tightening of the collet around a shank of an accessory for the rotary-style power tool. The collet chuck, the system and/or the method provide tool-less manual loosening of the collet for accessory replacement.

18 Claims, 4 Drawing Sheets

(52) U.S. Cl.
CPC .. *Y10T279/17256* (2015.01); *Y10T 279/17521* (2015.01); *Y10T 279/17957* (2015.01); *Y10T 279/182* (2015.01); *Y10T 279/247* (2015.01); *Y10T 408/03* (2015.01); *Y10T 408/953* (2015.01)

(56) References Cited

U.S. PATENT DOCUMENTS

| | | |
|---|---|---|
| 656,357 A | 8/1900 | Kramer |
| 1,449,454 A | 12/1921 | Smith |
| 1,531,280 A | 11/1922 | Frayer |
| 2,211,216 A | 8/1940 | Oster |
| 2,326,541 A | 8/1943 | Kuehn |
| 2,386,960 A | 10/1945 | Jellinek |
| 2,491,358 A | 12/1949 | Bogart |
| 2,567,605 A | 9/1951 | Kean |
| 2,585,747 A | 2/1952 | Denzler |
| 2,614,315 A | 10/1952 | Davison |
| 2,769,643 A | 11/1956 | Denzler |
| 2,769,644 A | 11/1956 | Denzler |
| 2,922,657 A | 1/1960 | Garrison et al. |
| 3,085,813 A | 4/1963 | Sampson |
| 3,365,205 A | 1/1968 | Riveglia |
| 3,674,281 A | 7/1972 | Hedrick |
| 3,709,508 A | 1/1973 | Dudley |
| 3,727,928 A | 4/1973 | Benjamin |
| 3,802,713 A | 4/1974 | Levy |
| 3,947,047 A | 3/1976 | Hultman |
| 4,032,163 A | 6/1977 | Holt |
| 4,199,160 A | 4/1980 | Bent |
| 4,237,659 A | 12/1980 | Welsch et al. |
| 4,303,252 A | 12/1981 | Snider |
| 4,572,525 A | 2/1986 | Feldmeier et al. |
| 4,574,460 A | 3/1986 | Bair |
| 4,700,956 A | 10/1987 | Rohm |
| 5,147,165 A | 9/1992 | Tempest |
| 5,348,319 A * | 9/1994 | Stolzer ........................ 279/77 |
| 5,464,229 A | 11/1995 | Salpaka |
| 5,577,743 A | 11/1996 | Kanaan et al. |
| 5,788,290 A | 8/1998 | Meisinger |
| 5,810,366 A | 9/1998 | Montjoy et al. |
| 5,820,135 A | 10/1998 | Han et al. |
| 5,820,136 A | 10/1998 | Han et al. |
| 5,921,563 A | 7/1999 | Huggins et al. |
| 5,944,327 A | 8/1999 | Kanaan |
| 5,947,484 A | 9/1999 | Huggins et al. |
| 6,244,797 B1 | 6/2001 | Wheeler |
| 6,350,087 B1 | 2/2002 | Berry et al. |
| 6,533,291 B2 | 3/2003 | Huggins et al. |
| 7,264,429 B2 | 9/2007 | Miller |
| 2001/0006280 A1 | 7/2001 | Hangleiter |
| 2002/0105149 A1 | 8/2002 | Karst |

FOREIGN PATENT DOCUMENTS

| | | |
|---|---|---|
| DE | 43 07 780 | 9/1994 |
| DE | 44 43 028 | 7/1995 |
| DE | 44 22 952 | 1/1996 |
| DE | 100 26 021 | 11/2001 |
| DE | 103 09 242 A1 | 9/2004 |
| EP | 1 464 424 A1 | 10/2004 |
| GB | 625578 | 6/1949 |
| JP | 56 134109 | 10/1981 |
| JP | 07 214406 | 8/1995 |
| JP | 08 019906 | 1/1996 |
| JP | 2004034265 | 2/2004 |
| JP | 2007 038340 | 2/2007 |
| JP | 2007 136591 | 6/2007 |
| JP | 2008 073809 | 4/2008 |

OTHER PUBLICATIONS

Written Opinion of the International Searching Authority for corresponding PCT Application (e.g. PCT/US2010/001533) mailed Jul. 28, 2010 (6 pages).

\* cited by examiner

BI-DIRECTIONAL QUICK CHANGE TOOL-LESS LEVER AND WEDGE ACTUATED COLLET CHUCK, SYSTEM AND/OR METHOD FOR USING THE SAME

This application is a continuation application of co-pending application Ser. No. 12/800,938, filed on May 26, 2010 (now U.S. Pat. No. 8,608,414), which in turn claims the benefit of U.S. Provisional Application Ser. No. 61/217,533, filed Jun. 1, 2009, the disclosures of both of these patent applications are totally incorporated by reference herein in their entirety.

BACKGROUND OF THE INVENTION

The present invention generally relates to a bi-directional quick change tool-less lever and wedge actuated collet chuck, a system and/or a method for using the same. More specifically, the present invention relates to a collet chuck, a system and/or a method that may be attached to and/or that may be integrated with high speed, variable speed and/or low speed-rotary-style power tools, such as, for example, electrically driven rotary-style power tools, pneumatically-driven rotary-style power tools and/or the like. The collet chuck, the system and/or the method may provide tool-less automatic and/or tool-less manual tightening of the collet around a shank of an accessory for the rotary-style power tool. The collet chuck, the system and/or the method may provide tool-less manual loosening of the collet for accessory replacement while the rotary-style power tool is not operating. The collet chuck, the system and/or the method may be suitable for bi-directional operation of the rotary-style power tool, and the tool-less automatic tightening may occur in both clockwise and counter clockwise directions of operation.

It is generally known that variable speed rotary-style power tools are widely used to perform various mechanical operations, such as, for example, grinding, carving, polishing, cutting, drilling and/or the like. Rotary-style power tools are used by, for example, carpenters, machinists, wood workers, stone workers, manicurists, home hobbyists and/or the like. To perform the mechanical operations, various accessories are provided, each having a shank for insertion into a collet of the rotary-style power tool. The shanks of most accessories on the market are cylindrical and have a specific diameter, such as, for example, one quarter (¼) of an inch, three sixteenths (³⁄₁₆) of an inch, one eighth (⅛) of an inch, four to six (4-6) millimeters and/or the like. Collets in existing rotary-style tools have diameters sized to receive the shanks of various accessories. The collets are tightened to exert pressure along a length of the shank of the accessory for rotary-centered operation of the accessory. Symmetrical pressure and exact sizing of the shanks and collets allow for a precise tool bit centricity and an accurate tolerance-in-round (TIR) required to operate high speed rotary devices effectively. Three-jaw-type chucks are used to secure accessories, such as, for example, drill bits of all sizes. Three-jaw-type chucks require tightening that may be accomplished by hand; however, three-jaw-type chucks do not provide the accurate tool bit centricity, the precise TIR and/or the holding forces required for high speed rotary operations.

To accomplish a desired mechanical operation, a user of the rotary-style power tool selects the appropriate accessory. The rotary-style power tool may have a lock pin button or may provide an insertion hole for receiving a post that may be inserted by the user to prevent rotation of the collet during accessory changes. In some rotary-style power tools, two wrenches are required: a first sized wrench to prevent rotation of the collet; and a second sized wrench to tighten a collet nut. The user places the shank of the accessory into the collet of the rotary-style power tool and tightens the collet nut using the second sized wrench. The user releases the lock pin button, removes the post and/or removes the first sized wrench and performs the mechanical operation with the rotary-style power tool. To remove and/or to change the accessory, the user re-engages the lock pin button, inserts the post into the insertion hole or uses first sized wrench to prevent rotation of the collet. The user locates the second sized wrench, loosens the collet nut with the second sized wrench, removes the accessory from the collet and/or inserts the accessory as needed. As a result, changing accessories in existing rotary-style power tools is time consuming and requires at least one additional tool that is separate and that must be located.

Attempts to provide quick change tool-less systems for rotary-style power tools, especially for variable and high speed rotary-style power tools, have failed to provide the desired functionality and versatility provided by systems that require additional tools or wrenches to tighten the collet. For example, it is generally known to provide a spring to pull or push directly on a tapered collet to force the collet closed. Milling machine tools use a spring to apply pressure to a tapered collet; however, a very stiff spring is needed. The stiffness of the spring requires the use of additional tools or even pneumatic pressure to relieve the spring pressure to release the shank or a v-flanged tool holder from the tapered collet or bore.

Further, providing automatic tightening of the collet during operation has been achieved only with limited success. For example, it is generally known to provide quick release collet and chuck devices such as those taught by Han et al. in U.S. Pat. No. 5,820,136 and by Huggins et al. in U.S. Pat. No. 5,921,563. Han et al. and Huggins et al. teach using longitudinal members or cam members with centrifugal forces to tighten the collet during rotational operation only. However, Han et al. and Huggins et al. have failed to employ a system to maintain adequate pressure on the collet when the rotary-style tool is operating at low revolutions per minute (RPMs) or when the rotary-style tool is not operating at all. Therefore, when RPMs are reduced, such as when a user forces the accessory onto a surface during operation, a holding power of the collet must be at its highest to counteract the forces of friction. However, the reduced RPMs create lower centrifugal forces and a lower holding power rendering the integrated collet and chuck devices of Han et al. and Huggins et al. ineffective during RPM fluctuations. The holding power is minimal when the rotary-style device is not operating. Further, the collet and chuck devices of Han et al. and Huggins et al. do not allow for manual tightening of the collet to provide cutting force while the rotary-style device is not operating. Other disadvantages of the teachings of Han et al. and Huggins et al. include their inability to provide a collet removal or size change due to the frusto-conical geometry of the collet and its complementary housing.

A need, therefore, exists for a bi-directional quick change tool-less lever and wedge actuated collet chuck, a system and/or a method for using the same. Further, a need exists for a collet chuck, a system and/or a method that may be attached as an accessory to and/or that may be integrated with high speed, variable speed and/or low speed rotary-style power driven tools. Still further, a need exists for a collet chuck, a system and/or a method that may provide tool-less automatic and/or tool-less manual tightening of the collet around a shank of an accessory. Further, a need exists for a collet chuck, a system and/or a method that may provide for a tool-less manual loosening of the collet and subsequent accessory exchange while the rotary-style power tool is not operating. Further, a need exists for a collet chuck, a system and/or a method that may provide maximum and symmetrical tool bit shank holding pressures before, during and/or after operation of the rotary-style power tool. Still further, a need exists for a collet chuck, a system and/or a method that may apply constant and uninterrupted pressure to the collet before, during and/or after operation of the rotary-style power tool. Still further, a need exists for a collet chuck, a system and/or a method that may have a spring actuated and/or a manually actuated wedge that may abut effort arms of the levers wherein the levers have corresponding resistance arms that abut and tighten the collet. Still further, a need exists for a collet chuck, a system and/or a method that may allow for collet ejection, replacement and/or exchange by a user. Still further, a need exists for a collet chuck, a system and/or a method that may allow for quick change of accessories for rotary-style power tools. Moreover, a need exists for a collet chuck, a system and/or a method that may be intuitive to use with little or no additional instruction required.

SUMMARY OF THE INVENTION

The present invention generally relates to a bi-directional quick change tool-less lever and wedge actuated collet chuck, a system and/or a method for using the same. More specifically, the present invention relates to a collet chuck, a system and/or a method that may be attached to and/or that may be integrated with high speed, variable, speed and/or low speed rotary-style power tools. The collet chuck, the system and/or the method may provide tool-less automatic tightening of the collet while operating the rotary-style power tool. The collet chuck, the system and/or the method may provide tool-less manual tightening of the collet by sliding a release sleeve axially upwards towards the accessory while the rotary-style power tool is not operating. The collet chuck, the system and/or the method may provide tool-less manual loosening of the collet by sliding the release sleeve axially downwards away from the accessory while the rotary-style power tool is not operating.

The collet chuck, the system and/or the method may have axially placed levers that may generate multipliable forces on sides of a collet to employ a symmetrical tool bit shank holding pressure. Further, the collet chuck, the system and/or the method may have a centrally positioned wedge that may be driven by a spring and/or by the release sleeve to a position between effort arms of the levers and the collet. The wedge may be driven axially upwards in a direction towards the accessory to position the wedge between the effort arms of the levers and the collet to press corresponding resistance arms of the lever against the collet to tighten the collet around the shank of the accessory. The release sleeve, which may be in communication with the wedge and/or the spring, may be manually maneuvered axially in a direction away from the accessory to a down position to compress the spring and/or to dislodge the wedge thereby eliminating tool bit shank holding pressure. Maintaining the release sleeve in the down position may allow for removal and/or replacement of the accessory. Letting go of the release sleeve automatically actuates the spring-to-wedge-to-lever action which may create enough tool bit shank holding pressure to hold the accessory in place until the user begins operation of the rotary-style power tool. If the wedge has not been manually driven upwards using the release sleeve to create maximum pressure on the collet, operation of the rotary-style power tool will automatically tighten the collet. Rotation of the collet chuck and/or the system during operation may create centrifugal forces that may draw the effort arms of the levers away from a central axis of the collet chuck as the spring drives the wedge between the effort arms of the levers and the collet. After tightening the collet, either automatically and/or manually, a positioning of the wedge between the effort arms of the levers and the collet may ensure maximum tool bit shank holding pressure before, during and/or after operating the rotary-style power tool. The spring-to-wedge-to-lever action of the collet chuck and/or the system may require no operation of the rotary-style power tool to maintain maximum tool bit shank holding pressure.

To this end, in an embodiment of the present invention, a bi-directional quick change tool-less chuck for controlling pressure on a tool bit shank in a rotary-style power tool is provided. The chuck has a collet for receiving the tool bit shank wherein the collet has an exterior surface and a central axis. Further, the chuck has a main body having a central axis wherein the main body has a distal end and a proximal end wherein the proximal end is positioned opposite the distal end wherein the main body has an interior surface and an exterior surface wherein the exterior surface is positioned opposite to the interior surface wherein the collet is positioned within the main body adjacent to the interior surface of the main body wherein the main body has a lever slot extending through the main body from the exterior surface of the main body to the interior surface of the main body. Still further, the chuck has a first lever positioned within the lever slot wherein the first lever has a fulcrum point positioned between an effort arm of the first lever and a resistance arm of the first lever wherein the first lever is positioned axially about the main body wherein the first lever is attached to the main body at the fulcrum point wherein the first lever articulates about the fulcrum point wherein the resistance arm of the first lever passes through the lever slot to abut the collet to apply holding pressure to the collet wherein articulation of the effort arm away from the main body increases the holding pressure. Still further, the chuck has a wedge positioned around the main body wherein the wedge is slidable with respect to the central axis of the main body. Moreover, the chuck has a spring positioned adjacent to the wedge wherein the spring actuates the wedge towards the collet between the main body and the effort arm of the first lever.

In an embodiment, the chuck has a release sleeve having an interior surface positioned around the main body wherein the wedge contacts the interior surface of the release sleeve wherein the release sleeve actuates the wedge with respect to the collet.

In an embodiment, the chuck has a longitudinal slot on the main body that mates with the interior surface of the release sleeve to prevent a rotation of the release sleeve.

In an embodiment, the chuck has a cylindrical cover attached to the main body wherein the cover houses the main body and the first lever.

In an embodiment, the chuck has a second lever placed axially about the main body to create symmetrical holding pressure.

In an embodiment, the chuck has a bottom attached to the main body wherein the spring is positioned between the bottom and the wedge.

In an embodiment, the exterior surface of the collet is cylindrical about the central axis of the collet.

In an embodiment, the effort arm and the resistance arm each have a length wherein the length of the effort arm is greater than the length of the resistance arm.

In an embodiment, the effort arm and the resistance arm each have a mass wherein the mass of the effort arm is greater than the mass of the resistance arm.

In an embodiment, the chuck has a concave tip on the resistance arm of the first lever sized to mate with the exterior surface of the collet.

In another embodiment, a system for tightening a tool bit shank holding pressure is provided. The system has a rotary-style power tool having a drive shaft wherein the rotary-style power tool rotates the drive shaft. Further, the system has a chuck having a collet wherein the chuck is connected to the drive shaft wherein the chuck rotates in conjunction with a rotation of the drive shaft. Still further, the system has a plurality of levers connected to the chuck wherein the levers are axially positioned with respect to the collet wherein the levers articulate onto the collet to place a pressure on the collet wherein the rotation of the chuck articulates the levers onto the collet. Still further, the system has a moveable wedge housed within the chuck wherein driving the wedge into a plurality of positions abutting the levers articulates the levers onto the collet. Moreover, the system has a spring housed within the chuck wherein the spring actuates the wedge into the plurality of positions abutting the levers during the rotation of the chuck wherein the spring maintains the plurality of positions of the wedge after the rotation of the chuck ceases.

In an embodiment, the system has a sleeve for maneuvering the wedge wherein the sleeve is moveable in a direction towards the collet to drive the wedge into the plurality of positions abutting the levers to increase the pressure wherein the sleeve is moveable in a direction away from the collet to dislodge the wedge from the plurality of positions abutting the levers to reduce the pressure.

In an embodiment, the system has a tip on the levers wherein the tip is sized to increase a surface area of contact between the levers and the collet.

In an embodiment, the system has a tapered surface on the wedge wherein the tapered surface decreases a surface area of the wedge that abuts the levers.

In an embodiment, the chuck is integrated within the rotary-style power tool.

In an embodiment, the chuck is attached as an accessory to the rotary-style power tool.

In another embodiment, a method for installing a first accessory into a rotary-style power tool is provided. The method has the step of providing a chuck having a collet for receiving the first accessory wherein the chuck has a manually operated release sleeve that moves a wedge into a plurality of positions with respect to a plurality of levers that are axially placed within the chuck wherein articulation of the levers changes a holding pressure on the collet and further wherein the chuck has a spring that actuates the wedge and the release sleeve in a direction towards the collet. Further; the method has the step of sliding the release sleeve in a direction opposite of the collet to eliminate the holding pressure. Still further, the method has the step of inserting the first accessory into the collet. Moreover, the method has the step of releasing the release sleeve wherein the spring forces the release sleeve and the wedge towards the collet to articulate the levers onto the collet to increase the holding pressure.

In an embodiment, the method has the step of operating the rotary-style power tool to create centrifugal forces that further articulate the levers onto the collet to further increase the holding pressure.

In an embodiment, the method has the step of manually sliding the release sleeve towards the collet to drive the wedge into the levers to further articulate the levers onto the collet to further increase the holding pressure.

In an embodiment, the method has the step of removing a second accessory from the collet before the step of inserting the first accessory into the collet.

It is, therefore, an advantage of the present invention to provide a quick change tool-less lever and wedge actuated collet chuck, a system and/or a method for using the same.

Another advantage of the present invention is to provide a collet chuck, a system and/or a method that may be attached to and/or that may be integrated with high speed, variable speed and/or low speed rotary-style power tools.

And, another advantage of the present invention is to provide a collet chuck, a system and/or a method that may provide tool-less automatic and/or tool-less manual tightening of the collet around a shank of an accessory for the rotary-style power tool.

Yet another advantage of the present invention is to provide a collet chuck, a system and/or a method that may provide tool-less manual loosening of the collet for accessory replacement while the rotary-style power tool is not operating.

And, another advantage of the present invention is to provide a collet chuck, a system and/or a method that may be used with any rotary-style power tool for any intended application.

A further advantage of the present invention is to provide a collet chuck, a system and/or a method that may provide maximum and symmetrical tool bit shank holding pressures before, during and/or after operation of the rotary-style power tool.

Moreover, an advantage of the present invention is to provide a collet chuck, a system and/or a method that may have at least two levers to apply symmetrical pressure to the collet before, during and/or after operation of the rotary-style power tool.

And, another advantage of the present invention is to provide a collet chuck, a system and/or a method that may have a spring actuated and/or a manually actuated wedge that may abut effort arms of the levers wherein the levers have corresponding resistance arms that abut and tighten the collet.

Yet another advantage of the present invention is to provide a collet chuck, a system and/or a method that may be relatively light weight, may have a slim outside diameter and/or may be balanced for optimal operation in rotary-style power tools.

Another advantage of the present invention is to provide a collet chuck, a system and/or a method that may allow for collet ejection, replacement and/or exchange by a user.

Yet another advantage of the present invention is to provide a collet chuck, a system and/or a method that may allow for quick change of accessories for rotary-style power tools.

Moreover, an advantage of the present invention is to provide a collet chuck, a system and/or a method that may provide tool-less manual tightening of the collet by sliding a release sleeve axially upwards towards the accessory while the rotary-style power tool is not operating.

And, another advantage of the present invention is to provide a collet chuck, a system and/or a method that may provide tool-less manual loosening of the collet by sliding a release sleeve axially downwards away from the accessory while the rotary-style power tool is not operating.

Yet another advantage of the present invention is to provide a collet chuck, a system and/or a method that may be suitable for bi-directional operation of a rotary-style power tool wherein tool-less automatic tightening may occur in both directions of operation.

Moreover, an advantage of the present invention is to provide a collet chuck, a system and/or a method that may be intuitive to use with little or no additional instruction required.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a bi-directional quick change tool-less lever and wedge actuated collet chuck, a system and/or a method for using the same. More specifically, the present invention relates to a collet chuck, a system and/or a method for using the same that may be attached to and/or that may be integrated with high speed, variable speed and/or low speed rotary-style-power tools.

Figures 1A, 1B:
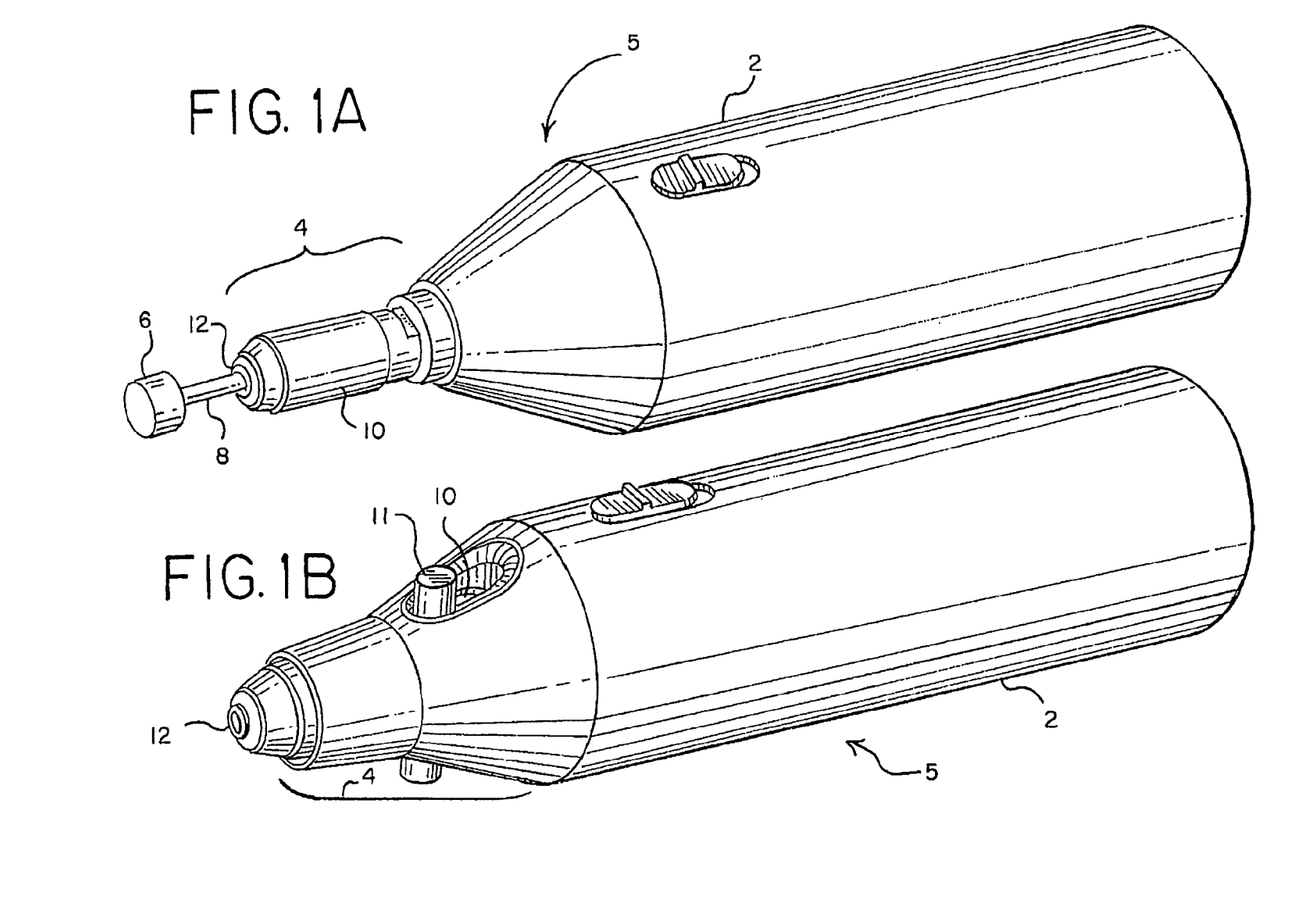
FIG. 1A illustrates a perspective view of a collet chuck and/or a system attached to an existing rotary-style power tool in an embodiment of the present invention.
FIG. 1B illustrates a perspective view of a collet chuck and/or a system integrated within a rotary-style power tool in an embodiment of the present invention.

Referring now to the drawings wherein like numerals refer to like parts, FIGS. 1A, 1B and FIGS. 2-9 illustrate a collet chuck 4, a system 5 and/or a method for using the same with a rotary-style power tool 2. The rotary-style power tool may be, for example, a corded and/or a battery-powered electrically driven rotary-style multi-purpose power tool, a pneumatically driven rotary-style multipurpose power tool, a milling tool, a drill, a rotatable saw, die grinders and/or the like. As shown in FIG. 1A, the collet chuck 4 may have a collet 12 for receiving a shank 8 of an accessory 6. After the collet 12 is tightened using the collet chuck 4 described herein, the accessory 6 may be used to perform a bi-directional mechanical operation, such as, for example, drilling, grinding, sharpening, cutting, cleaning, polishing, sanding, routing, carving, engraving and/or the like. The accessory 6 may be, for example, a drill bit, a cut blade, a rotatable saw blade, a scraper blade, an engraver, a grit paper, a polishing wheel and/or the like. The shank 8 of the accessory 6 may have a standard diameter, such as, for example, one quarter (¼) of an inch, three sixteenths (3/16) of an inch, one eighth (⅛) of an inch, four to six (4-6) millimeters and/or the like. The collet 12, when not pressed by the collet chuck 4, may have an internal diameter sized to slidably receive the shank 8 of the accessory 6. The present invention should not be deemed as limited to a specific embodiment of the accessory 6, the shank 8 and/or the rotary-style power tool 2. It should be understood that the accessory 6, the shank 8 and/or the rotary-style power tool 2 may be any rotary accessory, shank and/or rotary-style power tool, respectively, as known to one having ordinary skill in the art. Moreover, one having ordinary skill in the art may recognize that a size of the collet chuck 4 used may be related to a size of the rotary-style power tool 2 used and an intended application. A size of the collet 12 may be related to the size of the collet chuck 4 used, a size of the rotary-style power tool 2 used and/or the intended application. The present invention should not be deemed as limited to a specific size of the accessory 6, the shank 8, the rotary-style power tool 2, the collet 12 and/or the collet chuck 4. The size of the accessory 6, the shank 8, the rotary-style power tool 2, the collet 12 and/or the collet chuck 4 may be any size for the intended application as known to one having ordinary skill in the art.

FIG. 1A illustrates the collet chuck 4 and/or the system 5 as an addition or an accessory to an existing rotary-style power tool 2. However, the collet chuck 4 and/or the system 5 may be integrated with and/or manufactured for sale already built into a new rotary-style power tool as illustrated in FIG. 1B. The present invention should not be deemed as limited to an accessory use of the collet chuck 4 and/or the system 5 with existing rotary-style power tools 2. The collet chuck 4 and/or the system 5 may be manufactured and/or integrated together with new rotary-style power tools 2.

Figure 2:
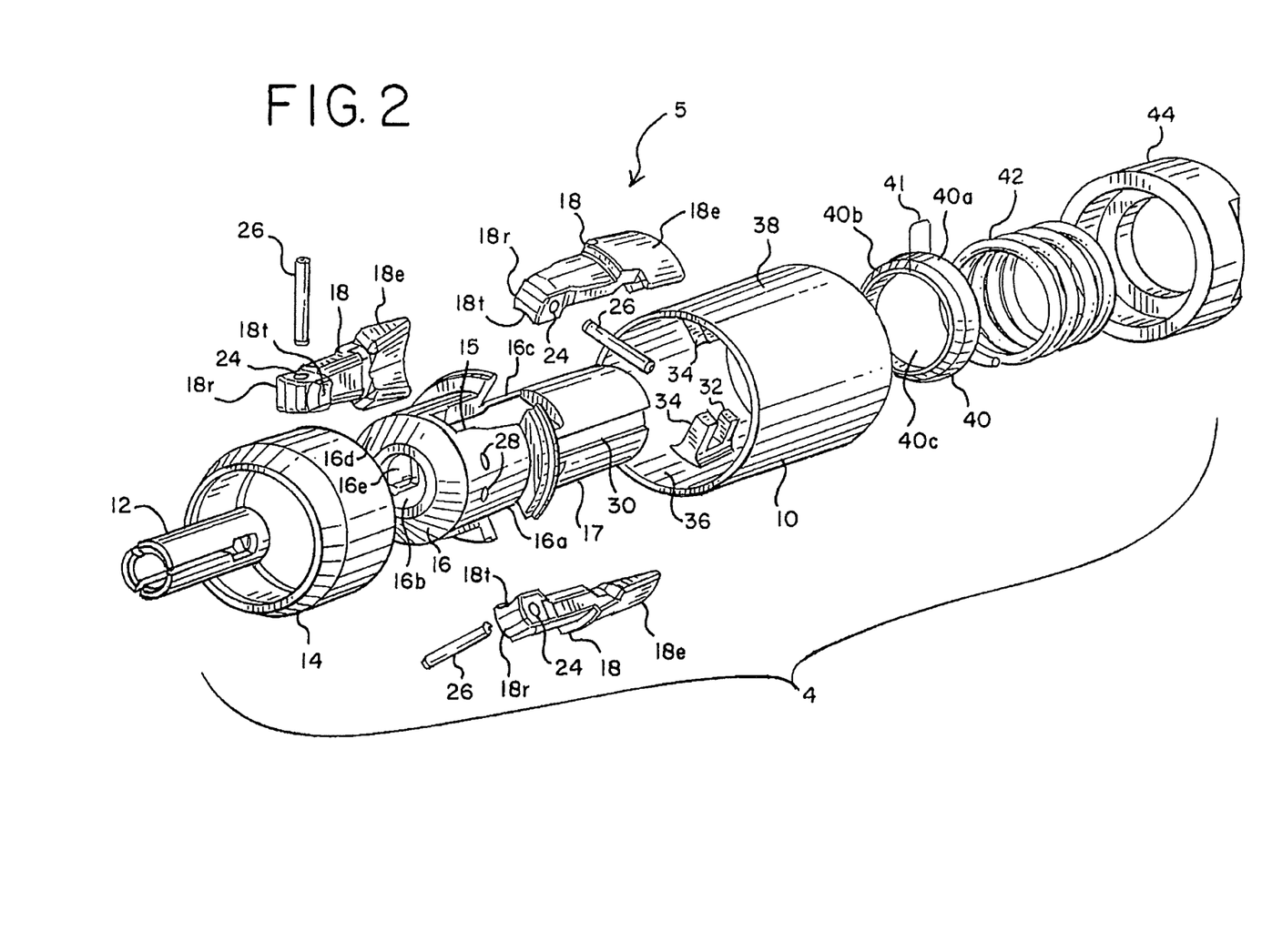
FIG. 2 illustrates an exploded perspective view of a collet chuck and/or a system in an embodiment of the present invention.

In a preferred embodiment, the collet 12 may be, for example a straight cylindrical collet as shown in the FIG. 2; however, collets 12 having various shapes and sizes may be used, such as, for example, tapered conical collets and/or the like. However, a straight cylindrical collet may be preferable to allow for small chuck diameters and/or the development and/or implementation of a collet removal and/or ejection system. The collet 12 may be manufactured from a material, such as, for example, steel, aluminum, zinc, injection molded plastics, glass-filled composites, carbon fiber composites, polycarbonates and/or the like. The collet 12 may be manufactured from a process, such as for, example, die casting, milling, turning, stock grinding, laser cutting, water jetting, injection molding, metal stamping and/or the like. It should be understood that the collet 12 may be manufactured in any configuration, by any process and from any material as known to one having ordinary skill in the art.

As illustrated in FIG. 2, the collet chuck 4 and/or the system 5 may have a main body 16. The main body 16 may be generally cylindrical in shape as shown in FIG. 2. The main body may have an external surface 16a and an internal surface 16b that may be positioned opposite to the external surface 16a. The main body 16 may have a proximal end 16c and a distal end 16d wherein the proximal end 16c is positioned closer to or proximal to the rotary-style power tool 2 wherein the distal end 16d may be positioned opposite to the proximal end 16c and may be positioned further from or distal to the rotary-style power tool 2 than the proximal end 16c. The distal end 16d of the main body 16 may have an aperture 16e sized to receive the collet 12 between the distal end 16d and the proximal end 16c. The collet 12 may be attached to the main body 16 after insertion into the aperture 16e. The main body 16 may have a body shaft 17 that may extend axially from the proximal end 16c of the main body 16 towards the rotary-style power tool 2. Also as shown in FIG. 2, the body shaft 17 of the main body 16 may have one or more body slots 30 that may extend longitudinally along a length of the body shaft 17. The main body 16 may have a lever slot 15 which may provide mechanical access to the collet 12 which may be situated within the bore 16e of the main body 16. In an embodiment, the main body 16 may have a corresponding lever slot 15 for receiving each lever 18. Preferably, the main body 16 may be balanced and may be mounted to the rotary-style power tool 2 via the body shaft 17. The main body 16 and/or the body shaft 17 may be manufactured from a material, such as, for example, steel, aluminum, zinc, injection molded plastics, glass-filled composites, carbon fiber composites, polycarbonates and/or the like. The main body 16 and the body shaft 17 may be manufactured from a process, such as for, example, die casting, milling, turning, injection molding and/or the like. It should be understood that the main body 16 and/or the body shaft 17 may be manufactured by any process and from any material as known to one having ordinary skill in the art.

As shown in FIG. 2, the collet chuck 4 and/or the system 5 may have at least two or more levers 18 that may be axially positioned into the lever slots 15 of the main body 16. Each of the levers 18 may have fulcrum points 24 which may be, for example, holes that may extend through each of the levers 18. The levers 18 may be rotationally attached to the main body 16 by inserting a fulcrum pin 26 through corresponding fulcrum pin holes 28 on the main body 16 and through the fulcrum points 24. Each of the levers 18 may have an effort arm 18e and a resistance arm 18r. The fulcrum point 24 may be located between the effort arm 18e and the resistance arm 18r. To gain a mechanical advantage and to achieve multipliable forces on the collet 12, a length of the effort arm 18e may be greater than a length of the resistance arm 18r. Further, a mass of the effort arm 18e, particularly at an end of the effort arm 18e located opposite to the fulcrum point 24, may be greater than a mass of the resistance arm 18r of the lever 18. The length of the effort arm 18e, the amount of mass on the effort arm 18e and/or the positioning of the mass on the effort arm 18e may vary by application depending on, for example, space available in the collet chuck 4, weight requirements and/or desired amount of tool bit shank holding pressure. The resistance arm 18r may abut the collet 12 at or near a distal end of the collet 12. In an embodiment (not shown), the collet chuck 4 and/or the system 5 may not utilize the collet 12. Without the collet 12, the resistance arms 18r of the levers may directly abut the shank 8 of the accessory 6 to hold the accessory 6 in place for use during operation of the rotary-style power tool 2.

As shown in FIG. 2, the resistance arm 18r may have a concave tip 18t formed around the fulcrum point 24 that may be tangent to a wall of the collet 12. The concave tip 18t may provide an increased surface area of contact between the collet 12 and the resistance arm 18r and/or that may prevent and/or may minimize denting on the collet 12 and/or on the resistance arm 18r. In an embodiment, the resistance arm 18r may have a flat tip (not shown) which may abut a flat surface (not shown) on the collet 12 that may prevent and/or may minimize denting on the collet 12 and/or on the resistance arm 18r.

As the effort arm 18e of the lever 18 may extend radially outward from the central axis of the collet chuck 12 about the fulcrum point 24 and the fulcrum pin 26, the resistance arm 18r and/or the concave tip 18t presses the collet 12 towards the shank 8 of the accessory 6. In an embodiment, the effort arm 18e may rotate, for example, one to five degrees to utilize the lever 18 to collet pressure point. However, the effort arm 18e may rotate any distance and/or any angle required to create the desired tool bit shank holding pressure and/or a desired collet closing distance. Depending on the collet 12 used, at least two levers 18 may be used to apply symmetrical forces to the collet 12 to provide symmetrical tool bit shank holding pressure. However, any number of levers 18, such as, for example, three levers 18 as depicted in the figures, may be used in the collet chuck 4 and/or the system 5 to achieve symmetrical tool bit shank holding pressure. In an embodiment, pressure points between the resistance arm 18r, the concave tip 18t and/or the collet 12 may be constructed from hardened steel, such as, for example, O1 or 4140 tool steel that may be; for example, hardened and/or tempered to Rockwell 60c hardness. Any denting of the resistance arm 18 and/or the collet 12 may reduce efficiency of the collet chuck 4 and/or the system 5. The present invention should not be deemed as limited to a specific material of construction of the lever 18 and/or a hardness thereof. The material of construction of the lever 18 and/or of the hardness thereof may be any material and/or hardness, respectively, as known to a person having ordinary skill in the art.

Figure 3:
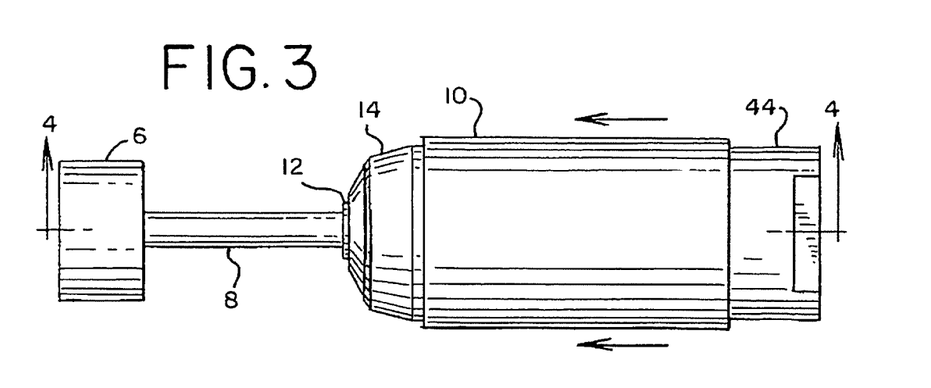
FIG. 3 illustrates a side view of a collet chuck and/or a system in "hold position" in an embodiment of the present invention.
Figure 4:
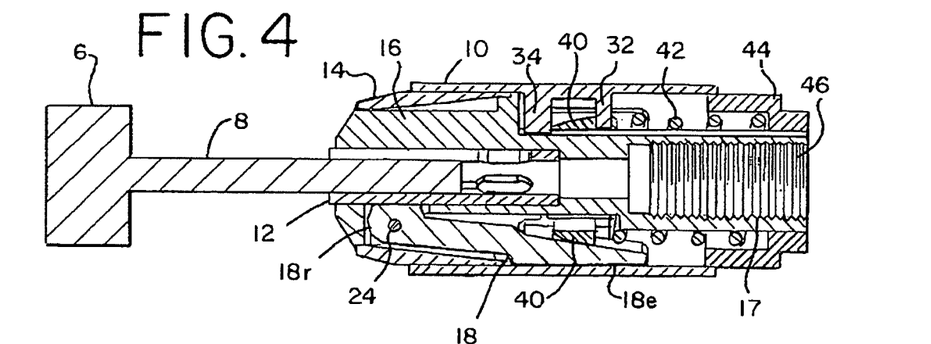
FIG. 4 illustrates a cross-sectional side view of a collet chuck and/or a system in "hold position" taken at line 4-4 of FIG. 3 in an embodiment of the present invention.

In the present invention, the effort arm 18e of the lever 18 may be maneuvered radially outward from the central axis of the collet chuck 4 by at least two mechanisms. First, by rotating the collet chuck 4 and/or the system 5 during operation of the rotary-style power tool, centrifugal forces may push the effort arm 18e of the lever 18 in a direction radially outward with respect to the central axis of the collet chuck 4. Second, as shown in FIGS. 3 and 4, a wedge 40 may be driven between the effort arm 18e of the lever 18 and the body shaft 17 to push the effort arm 18e of the lever 18 in a direction radially outward with respect to the central axis of the collet chuck 4 and to force the resistance arm 18r of the lever 18 onto the collet 12. The levers 18 may be manufactured from a material, such as, for example, steel, aluminum, zinc, injection molded plastics, glass-filled composites, carbon fiber composites, polycarbonates and/or the like. The levers 18 may be manufactured from a process, such as for, example, die casting, milling, turning, stock grinding, injection molding, metal stamping, metal sintering, metal injection molding and/or the like. It should be understood that the levers 18 may be manufactured by any process and from any material as known to one having ordinary skill in the art.

The wedge 40 may be generally cylindrical in shape. The wedge 40 may have a height defined between a distal end 40b and a proximal end 40a wherein the proximal end 40a may be positioned opposite to the distal end 40b. The distal end 40b may be positioned further from the rotary-style power tool 2 than the proximal end 40a. The wedge 40 may have an aperture 40c that may extend between the distal end 40b and the proximal end 40a of the wedge 40. The aperture 40c of the wedge 40 may be sized to slidably receive the body shaft 17 of the main body 16. The wedge may slide along the body shaft 17 of the main body 16. The further the wedge 40 may slide towards the distal end 16d of the main body 16, the further the effort arm 18e is positioned away from the the central axis of the collet chuck 4 resulting in greater pressure on the collet 12 by the resistance arm 18r of the lever 18. The further the wedge 40 may slide away from the distal end 16d of the main body 16, the closer the effort arm 18e is positioned towards the central axis of the collet chuck 4 resulting in less pressure on the collet 12 by the resistance arm 18r of the lever 18. All pressure on the collet 12 may be eliminated when the wedge 40 is removed from abutment with the effort arm 18e at its farthest position towards the proximal end of the main body 16.

In a preferred embodiment, as shown in FIG. 2, the distal end 40b of the wedge 40 may have an outside radius 41 sized to taper and/or to slope to reduce a surface area of abutment between the wedge 30 and the effort arm 18e of the lever 18. The radius 41 may provide for smooth transition of applied pressure in varying lever angular positions. In an embodiment, a straight walled wedge (not shown) may be suitable; however, the straight walled wedge 40 may not slide as smoothly. The wedge 40 may be manufactured from a material, such as, for example, steel, aluminum, zinc, injection molded plastics, glass-filled composites, carbon fiber composites, polycarbonates and/or the like. The wedge 40 may be manufactured from a process, such as for, example, die casting, milling, turning, stock grinding, injection molding, metal stamping, metal sintering, metal injection molding and/or the like. In an embodiment, the wedge 40 may be hardened and/or tempered to, for example, a 30c Rockwell hardness. The present invention should not be deemed as limited to a specific method of construction of the wedge 40, a specific material of construction of the wedge 40 and/or a hardness thereof. The method of construction of the wedge 40, the material of construction of the wedge 40 and/or of the hardness thereof may be any method, material and/or hardness, respectively, as known to a person having ordinary skill in the art.

Figures 7, 8:
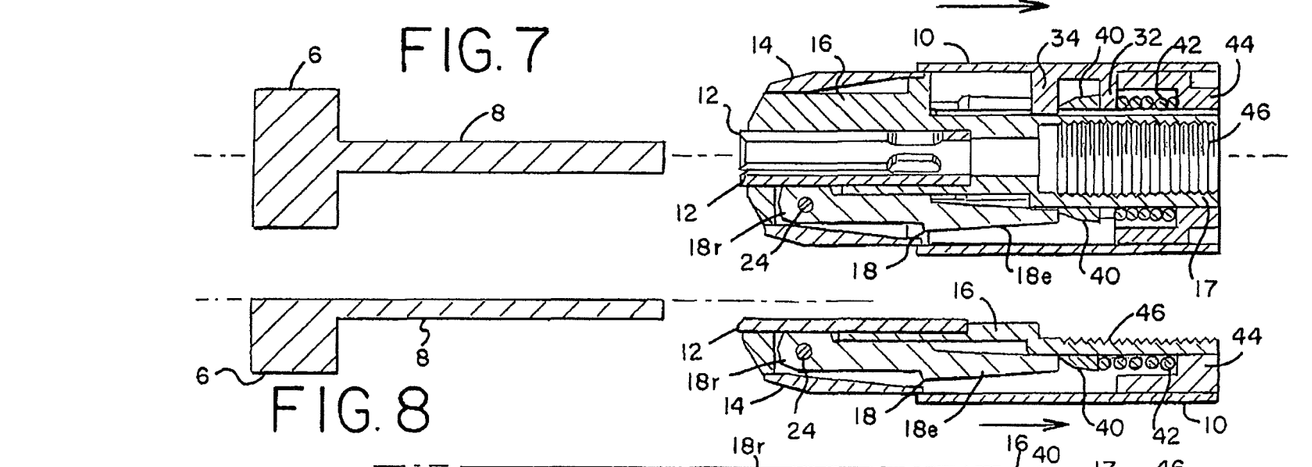
FIG. 7 illustrates a cross-sectional side view of a collet chuck and/or a system in "release position" taken at line 7-7 of FIG. 6 in an embodiment of the present invention.
FIG. 8 illustrates a partial side cross-sectional view of a collet chuck and/or a system in "release position" in an embodiment of the present invention.
Figure 9:
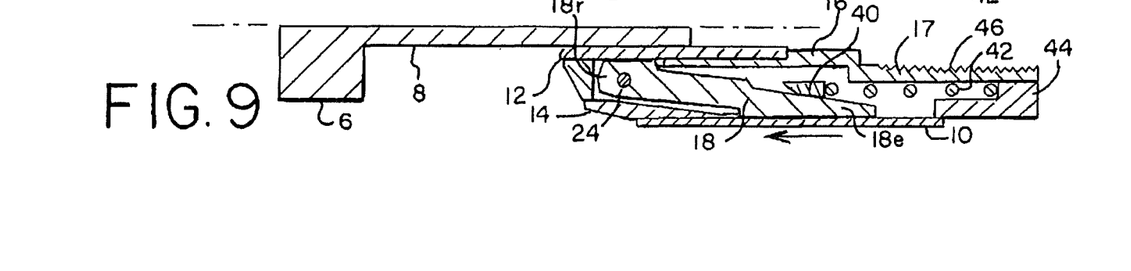
FIG. 9 illustrates a partial side cross-sectional view of a collet chuck and/or a system in "hold position" in an embodiment of the present invention.

In a preferred embodiment of the present invention, as shown in FIGS. 8 and 9, a spring 42 may be provided between the wedge 40 and a bottom 44 of the collet chuck 4 and/or the system 5. The bottom 44 may be, for example, constructed by turning steel mounts. The bottom 44 may be attached to the body shaft 17 with corresponding threads (not shown). Alternatively, the bottom 44 may be attached to the body shaft 17 by press fit operation which may ensure a clockwise and/or a counter clockwise rotation capability without a risk of loosening the body shaft 17 from the bottom 44. Further, the bottom 44 may have adapters (not shown), such as, for example, standard chuck adapters, that may accommodate various output shafts and/or arbors of various rotary-style power tools 2. The adapters may accommodate, for example, straight shafts, threaded shafts, tapered shafts and/or the like.

The spring 42 may be in communication with the proximal end 40a of the wedge 40 and/or a release sleeve 10 to drive the wedge 40 along a central axis of the body shaft 17 between the effort arms 18e of the levers 18 and the body shaft 17 of the main body 16. The effort arms 18e of the levers 18 may rest and/or may abut a side of the wedge 40 creating only perpendicular forces that do not generate much friction. As a result, the wedge 40 may be maintained in a vertical position with considerably less force from the spring 42. Provided that centrifugal forces may be moving the effort arms 18e of the levers 18 outward with respect to the collet 12 and/or the body shaft 17, the spring 42 may actuate and/or may drive the wedge 40 into open spaces between the effort arms 18e of the lever 18 and the body shaft 17. The present invention should not be deemed as limited to a specific method of construction of the spring 42, a specific material of construction of the spring 42 and/or a hardness thereof. The method of construction of the spring 42, the material of construction of the spring 42 and/or of the hardness thereof may be any method, material and/or hardness, respectively, as known to a person having ordinary skill in the art.

A cover 14 having a diameter may be provided to house a portion of the main body 16 together with a portion of the collet 12, portions of the levers 18, the fulcrum points 24 and/or the fulcrum pins 26. The cover 14 may hide the fulcrum pins 26 and/or any exposed openings while operating the release sleeve 10. Further, the cover 14 may prevent particles from entering the collet chuck 4 and/or the system 5.

The cover 14 may be manufactured from, for example, steel, aluminum, zinc, injection molded plastics, glass-filled composites, carbon fiber composites, polycarbonates and/or the like. Further the cover 14 may be, for example, press fit onto the main body 16. The present invention should not be deemed as limited to a specific method of construction of the cover 14, a material of construction for of the cover 14 and/or means of attaching the cover 14 to the main body 16.

Figure 5:
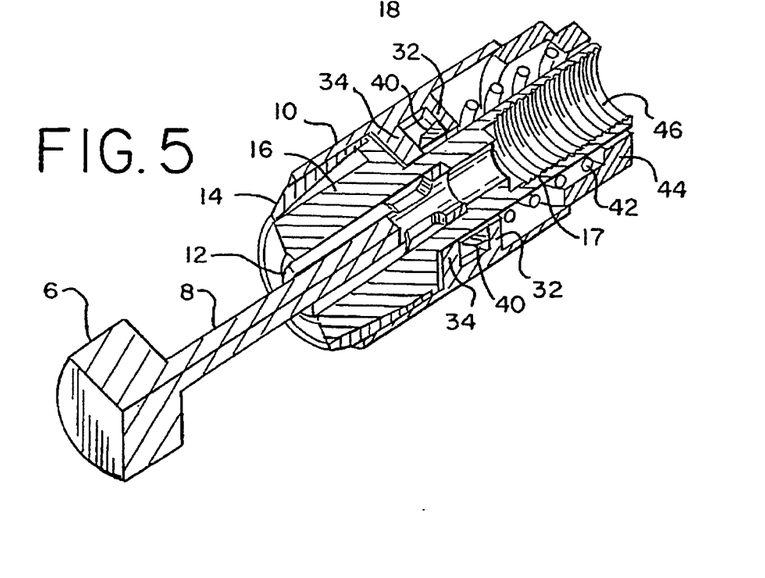
FIG. 5 illustrates a partial cross-sectional perspective view of a collet chuck and/or a system in "hold position" in an embodiment of the present invention.

The release sleeve 10 may be generally cylindrical in shape. The release sleeve 10 may have an internal diameter wherein the internal diameter of the release sleeve 10 may be sized to receive a portion of the main body 16, the body shaft 17, the cover 14, portions of the levers 18 and/or the wedge 40. The release sleeve 10 may have an interior surface 36 and an exterior surface 38 that may be positioned opposite to the interior surface 36. The release sleeve 10 may have at least two corresponding sets of fingers 32, 34 that may extend radially from the interior surface 36 of the sleeve 10. A distance between the fingers 32, 34 may be greater than the length of the wedge 40 as shown in FIG. 5. Further, the fingers 32, 34 may extend a distance from the interior surface 36 of the release sleeve 10 to penetrate the corresponding body slots 30 on the body shaft 17 of the main body 16. After the collet chuck 4 is assembled, the release sleeve 10 may be maneuvered manually by a user to slide the release sleeve 10 towards and/or away from the accessory 6. In an embodiment, as shown in FIG. 1B, the release sleeve 10 may have a release bar 11 that may be positioned in communication with the release sleeve 10 to maneuver the release sleeve 10. The release bar 11 may allow a user to maneuver the release sleeve 10 through a housing of a system 5 having the collet chuck 4 integrated with the rotary-style power tool 2. The fingers 32, 34 of the release sleeve 10 may be guided linearly by the body slots 30 on the body shaft 17 of the main body 16. The body slots 30 may prevent rotation of the release sleeve 10. In an embodiment (not shown), the exterior surface 38 of the release sleeve 10 may be textured, grooved, knurled and/or may have a grip to provide an area for a user to grasp and/or to maneuver the release sleeve 10.

The wedge 40 may be nested between each set of the fingers 32, 34. Therefore, manually maneuvering the release sleeve 10 upwards actuates the wedge 40 towards the accessory 6. Manually maneuvering the release sleeve 10 downwards actuates the wedge 40 away from the accessory 6 and towards the rotary-style power tool 2. Likewise, during spring actuation, the spring 42 abuts one of the fingers 32 and/or the wedge 40 driving the wedge 40 towards the accessory 6. When the spring 42 actuates the wedge 40 and/or the fingers 32, the release sleeve 10 slides together with the fingers 32, 34 and the wedge 40 towards the accessory 6. A length of the body slots 30 may be sized to prevent the release sleeve 10 from being maneuvered towards the collet 12 a distance that may damage the collet 12 when no shank 8 is inserted. The collet 12 may act as a spring and, therefore, has a maximum capacity before failure of the collet 12 may occur. The body slots 30 may prevent the release sleeve 10 from driving the wedge 40 a distance that may damage the levers 18 and/or the collet 12. Further, the cover 14 and/or the main body 16 may be sized to prevent the release sleeve 10 from driving the wedge 40 a distance that may damage the levers 18 and/or the collet 12. The effort arm 18e of the lever 18 may stop on the interior surface 36 of the release sleeve 10 which may prevent the release sleeve 10 from driving the wedge 40 the distance that may damage the levers 18 and/or the collet 12.

As shown in FIGS. 4, 5 and 7-9, the body shaft 17 may have a threaded bore hole 46, a press fit and/or a taper mount that may be used to attach the collet chuck 4 and/or the system 5 to a drive shaft and/or an arbor of the rotary-style power tool 2. The cover 14 may be connected to the main body 16 by, for example, press-fit operation, weld joints, a formed detent, a rolled edge, set screws, pins and/or the like. The body shaft 17 of the main body 16 may be connected to the bottom 44 by, for example, press-fit operation, weld joints, a formed detent, a rolled edge, set screws, pins and/or the like. The present invention should not be deemed as limited to the method and/or type of connection between the cover 14, the main body 16 and/or the bottom 44. The cover 14, the main body 16 and/or the bottom 44 may be connected in any manner as known to a person having ordinary skill in the art.

Figure 6:
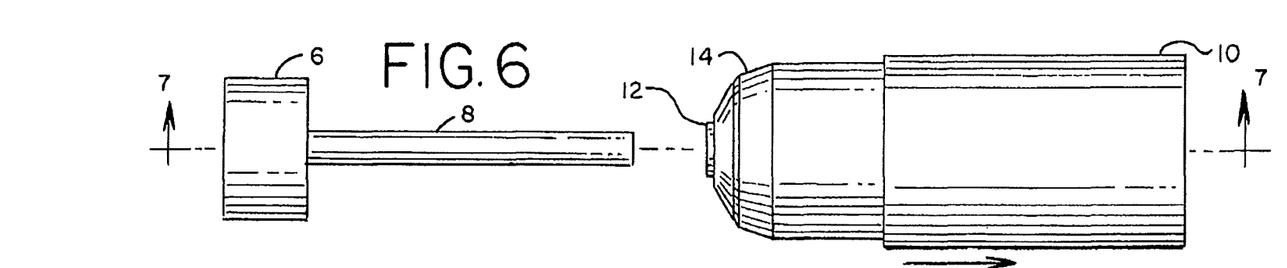
FIG. 6 illustrates a side view of a collet chuck and/or a system in "release position" in an embodiment of the present invention.

To remove and/or to replace an accessory 6 using the collet chuck 4 and/or the system 5, a user may slide and hold the release sleeve 10 in a release position by manually pulling the release sleeve 10 towards the bottom 44 of the collet chuck 4 and/or towards the rotary-style power tool 2. FIGS. 6-8 illustrate the release sleeve situated in the release position. Pulling the release sleeve 10 towards the bottom 44 of the collet chuck 4 and/or towards the rotary-style power tool 2 may compress the spring 42 as the fingers 34 pull the wedge 40 away from the space between the effort arms 18*e* of the levers 18 and the body shaft 17. As the wedge 40 is displaced, any potential spring energy that may exist in the collet 12 may become kinetic and may articulate the resistance arms 18*r* of the levers 18 away from the shank 8 thereby eliminating the symmetrical tool bit shank holding pressure. The user may then easily remove the accessory 6 from the collet 12 and/or may replace the accessory 6. After inserting the shank 8 of the replaced accessory 6 to a desired depth into the collet 12, the user may release the release sleeve 10. The compressed spring 42 may actuate and/or may drive the wedge 40 with the release sleeve 10 towards the collet 12 increasing the symmetrical tool bit shank holding pressure around the collet 12 enough to allow the user to begin operation of the rotary-style power tool 2.

At this point, the user has a variety of options to further adjust the tool bit shank holding pressure around the collet 12. The user may manually slide the release sleeve 10 further to any of a variety of positions between the release position and a maximum hold position. Maximum tool bit shank holding pressure may occur at the maximum hold position. The user may maneuver the release sleeve 10 to a variety of hold positions between the release position and the maximum hold position depending on, for example, the accessory 6 being used, the RPMs being used, the mechanical operation being performed, the friction being created between the accessory 6 and the adjacent surface and/or the like. FIGS. 3, 4, 5 and 9 illustrate the release sleeve 10 and/or the wedge 40 in one of the hold positions. The pressure exerted by the spring 42 on the wedge 40 and/or on the fingers 32 may ensure that the levers 18 do not force the wedge 40 and/or the release sleeve 10 in a direction away from the collet 12 before, during and/or after operation of the rotary-style power tool 2. Therefore, the tool bit shank holding pressure may be maintained and may remain symmetrical before, during and/or after operation of the rotary-style power tool 2.

As an alternative to manually sliding the release sleeve and the wedge 40 to the desired hold position, the user may operate the rotary-style power tool in either a clockwise and/or a counter clockwise direction to automatically tighten the collet 12. Centrifugal forces, which increase as the RPMs increase, may pull the effort arms 18*e* of the levers 18 away from the body shaft 17 which may cause the resistance arms 18*r* of the levers 18 to press against the collet 12 increasing the tool bit shank holding pressure. As the effort arms 18*e* are pulled away from the body shaft 17, the spring 42 may drive the wedge 40 and the release sleeve 10 into the hold position. As the RPMs are lowered during operation due to friction or due to the user reducing the RPMs of the rotary-style power tool 2, the wedge 40 and/or the release sleeve 10 may remain in the holding position maintaining the tool bit shank holding pressure. The tool bit shank holding pressure may be maintained by the spring actuated wedge 40 even after operation of the rotary-style power tool 2 ceases. In an embodiment, the user may be able to manually force the wedge 40 and/or the release sleeve 10 to a position beyond the hold position created by automatic centrifugal tightening. For extreme working conditions, including low RPM operations, the user may prefer manual tightening because low RPM operations may not generate enough centrifugal force to achieve the user's intended tool bit shank holding pressure. For supreme low RPM operations, the user may require manual tightening if a high RPM function is not performed first. In a preferred embodiment, manually moving the release sleeve 10 to the release position may eliminate the tool bit shank holding pressure to allow removal and/or replacement of the accessory 6.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method of operating a rotary power tool, comprising:
 allowing a first inward surface of a first lever to move inwardly toward an axis defined by a collet by moving a wedge located inwardly of and contacting the first inward surface in a first direction;
 allowing a second inward surface of the first lever to move away from the axis by movement of the wedge in the first direction;
 inserting a shank of an accessory into the collet after the second inward surface has moved away from the axis;
 forcing the first inward surface away from the axis by moving the wedge in a second direction opposite to the first direction;
 forcing the second inward surface toward the axis by moving the wedge in the second direction;
 forcing a first portion of the collet against the shank by forcing the second inward surface toward the axis; and
 rotating the collet with the second inward surface forced toward the axis.

2. The method of claim 1, wherein allowing the first inward surface of the first lever to move toward the axis comprises:
 compressing a spring by movement of the wedge in the first direction.

3. The method of claim 2, wherein forcing the first inward surface away from the axis comprises:
 moving the wedge in the second direction with the spring.

4. The method of claim 1, further comprising:
 generating a centrifugal force on the first lever arm while rotating the collet; and
 forcing the first inward surface away from the axis with the generated centrifugal force.

5. The method of claim 4, further comprising:
 moving the wedge in the second direction with the spring after forcing the first inward surface away from the axis with the generated centrifugal force.

6. The method of claim 1, further comprising:
allowing a third inward surface of a second lever to move toward the axis by moving the wedge in the first direction;
allowing a fourth inward surface of the second lever to move away from the axis by movement of the wedge in the first direction;
forcing the third inward surface away from the axis by moving the wedge in the second direction after inserting the shank;
forcing the fourth inward surface toward the axis by moving the wedge in the second direction;
forcing a second portion of the collet against the shank by forcing the fourth inward surface toward the axis; and
rotating the collet with the fourth inward surface forced toward the axis.

7. The method of claim 6, further comprising:
allowing a fifth inward surface of a third lever to move toward the axis by moving the wedge in the first direction;
allowing a sixth inward surface of the third lever to move away from the axis by movement of the wedge in the first direction;
forcing the fifth inward surface away from the axis by moving the wedge in the second direction after inserting the shank;
forcing the sixth inward surface toward the axis by moving the wedge in the second direction;
forcing a third portion of the collet against the shank by forcing the sixth inward surface toward the axis; and
rotating the collet with the sixth inward surface forced toward the axis.

8. The method of claim 7, wherein:
the first portion of the collet is separated from the second portion of the collet by a first slot;
the first portion of the collet is separated from the third portion of the collet by a second slot; and
the third portion of the collet is separated from the second portion of the collet by a third slot.

9. The method of claim 1, wherein forcing the first inward surface away from the axis comprises:
forcing a tapered outer surface portion of the wedge against the first inward surface.

10. A method of operating a rotary power tool, comprising:
moving a wedge in a first direction thereby allowing a first effort arm of a first lever to move toward an axis defined by a collet, and allowing a first concave tip of a first resistance arm of the first lever to move away from the axis;
inserting a shank of an accessory into the collet after the first concave tip has moved away from the axis;
moving the wedge in a second direction opposite to the first direction thereby forcing the first effort arm away from the axis, and forcing the first concave tip toward the axis by moving the wedge in the second direction;
forcing a first portion of the collet against the shank by forcing the first concave tip toward the axis; and
rotating the collet with the first concave tip forced toward the axis.

11. The method of claim 10, wherein moving a wedge in a first direction comprises:
compressing a spring by movement of the wedge in the first direction.

12. The method of claim 11, wherein moving the wedge in the second direction comprises:
moving the wedge in the second direction with the spring.

13. The method of claim 10, further comprising:
generating a centrifugal force on the first effort arm while rotating the collet; and
forcing the first effort arm away from the axis with the generated centrifugal force.

14. The method of claim 13, further comprising:
moving the wedge in the second direction with the spring after forcing the first effort arm away from the axis with the generated centrifugal force.

15. The method of claim 10, wherein:
moving the wedge in the first direction further comprises allowing a second effort arm of a second lever to move toward the axis, and allowing a second concave tip of a second resistance arm of the second lever to move away from the axis; and
moving the wedge in the second direction further comprises forcing the second effort arm away from the axis, and forcing the second concave tip toward the axis, the method further comprising:
forcing a second portion of the collet against the shank by forcing the second concave tip toward the axis.

16. The method of claim 15, wherein:
moving the wedge in the first direction further comprises allowing a third effort arm of a third lever to move toward the axis, and allowing a third concave tip of a third resistance arm of the third lever to move away from the axis; and
moving the wedge in the second direction further comprises forcing the third effort arm away from the axis, and forcing the third concave tip toward the axis, the method further comprising:
forcing a third portion of the collet against the shank by forcing the third concave tip toward the axis.

17. The method of claim 16, wherein:
the first portion of the collet is separated from the second portion of the collet by a first slot;
the first portion of the collet is separated from the third portion of the collet by a second slot; and
the third portion of the collet is separated from the second portion of the collet by a third slot.

18. The method of claim 10, wherein moving the wedge in the first direction further comprises:
forcing a tapered outer surface portion of the wedge against the first effort arm.

* * * * *